May 13, 1969  C. DOOLITTLE  3,443,579
NEEDLE VALVE DEVICE FOR ADJUSTING CUSHIONING IN
POWER CYLINDERS AND METHOD OF INSTALLING
Filed May 19, 1966

INVENTOR.
CHARLES DOOLITTLE
BY Ralph W. McIntire, Jr.
ATTORNEY

United States Patent Office 3,443,579
Patented May 13, 1969

3,443,579
NEEDLE VALVE DEVICE FOR ADJUSTING CUSHIONING IN POWER CYLINDERS AND METHOD OF INSTALLING
Charles Doolittle, Lexington, Ky., assignor to Westinghouse Air Brake Company, Wilmerding, Pa., a corporation of Pennsylvania
Filed May 19, 1966, Ser. No. 551,290
Int. Cl. F16k *43/00, 51/00*; F16l *55/18*
U.S. Cl. 137—315       4 Claims

ABSTRACT OF THE DISCLOSURE

A valve assembly for installation in a fluid pressure system and with particular means for installing the assembly. The assembly includes a nut with a threaded bore therethrough, a shaft having threads thereon and a valve member on one end and the threads on the shaft adjacent the valve being distorted to prevent removal of the shaft from the nut. Sealing means for surrounding the shaft and further sealing means between the nut and the housing into which the valve assembly is mounted.

---

This invention relates generally to needle valve devices for adjusting cushioning in power cylinders and the method of installing the needle valve device in the cylinder head of a power cylinder.

Heretofore, an externally adjustable needle valve device has been installed in each cylinder head of a power cylinder to control the passage of cushioning air, compressed between the face of the piston and the internal face of the cylinder head, to an exhaust cavity and associated exhaust port in the cylinder head. Adjustability of the needle valve is desirable so that adjustments thereof may be made while the cylinder is in operation. Conventionally, the needle valve device generally comprises a screw disposed in a head bore communicating with a passage which communicates the internal face of the cylinder head with the cavity, the screw having a tapered head forming a valve coacting with the passage into which it is adjustably disposed to gradually open or close the passage, and having a threaded portion extending through a threaded axial bore in a nut, the nut being externally attached to the head axially of the head bore or internally of the bore and threadedly received therein. In some instances the screw is threadedly received in the head bore, with the portion thereof extending through an unthreaded nut bore being smooth.

A disadvantage the foregoing types of needle valve construction is their susceptibility to loosening of the screw, or loosening of the screw and the nut, in response to vibration of the cylinder so that the fluid pressure in the aforementioned fluid pressure passage may expel the loosened screw, or screw and nut, in projectile fashion with the attending danger of injuring personnel or damaging other equipment It is an object of this invention to provide a simplified needle valve assembly comprising a screw type needle valve received through a nut, so that the needle valve may not after installation be withdrawn through the nut, and, after installation of the assembly in a cylinder head, the nut may not be expelled from the cylinder bore. It is a corollary object of this invention to provide a new method of installing the needle valve and nut in a cylinder head bore for preventing removal of the assembled needle valve and nut after installation thereof in the cylinder head bore.

In the present invention, this object is achieved by providing a screw having a tapered end forming a needle valve, with the threaded portion of the screw being threadedly received through an axial bore in a nut. The first few threads of the screw adjacent the tapered end are distorted to prevent withdrawal of the tapered screw end through the nut bore. The combined screw and nut are inserted in the head bore, tapered screw end first, with the nut resting on a shoulder provided by a counterbore of the head bore. Cement is disposed between the nut and the bore to prohibit the escape of air from the bore around the nut, and a preformed shoulder disposed between the counterbore and a second counterbore is bent over the periphery of the nut after installation of the screw and nut, to prevent removal of the nut from the counterbore.

These and other objects will become more readily apparent in the following description, taken in conjunction wtih the drawing, in which.

Figure 1:
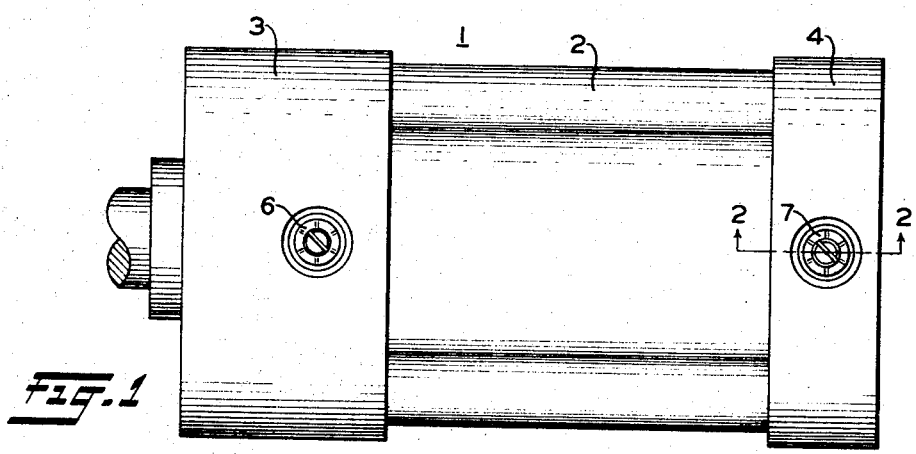
FIG. 1 is a side elevational view of a power cylinder device including the invention.

Referring now to the drawing, there is shown a power cylinder device generally indicated at 1 and comprising a cylinder body 2, a pair of cylinder heads 3 and 4 attached in any suitable manner to the opposite ends of the cylinder body, a piston assembly 5 and needle valve devices generally indicated at 6 and 7, installed in each cylinder head 3 and 4, respectively.

Except for details specifically hereinafter described, the cylinder body 2, the cylinder heads 3 and 4, and the piston assembly 5 may be of any suitable conventional type, the specific structure thereof shown herein being presented by way of example only.

Figure 2:
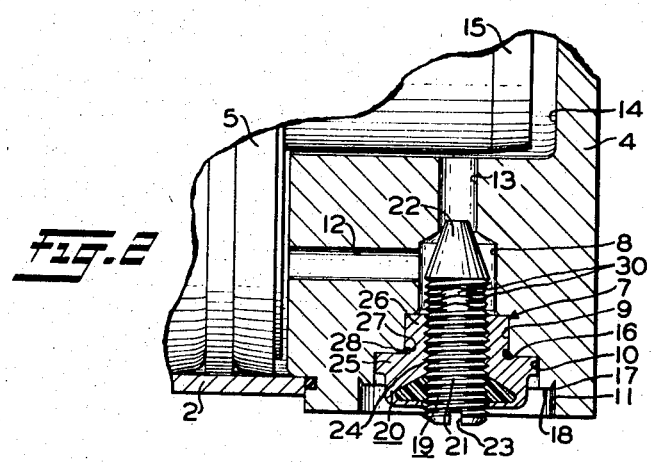
FIG. 2 is a sectional view of the power cylinder device of FIG. 1 taken substantially along the line 2—2 of FIG. 1 and showing the needle valve partially installed in the cylinder head.

Referring now to FIG. 2 of the drawing, there is shown the needle valve assembly 7 partially installed in cylinder head 4, it being understood that needle valve assembly 6 is similar thereto and is installed in cylinder head 3 in a similar manner.

The cylinder head 4 is provided with a bore 8 having a series of stepped counterbores 9, 10 and 11 accommodating the needle valve assembly 7 in the manner shown, and hereinafter described in detail. The bore 8 is laterally communicated with the internal cavity of the cylinder bore by way of a passage 12 opening at the internal face of the cylinder head 4, and the end of the bore 8 is communicated by way of a passage 13 and a cavity 14 in the cylinder head, the cavity being adapted for receiving therein in a close tolerance relationship a boss 15 of the piston assembly 5. The cavity 14 communicates with a combined supply and exhaust cavity, not shown, for supplying or exhausting fluid pressure to or from, respectively, the cavity 14, it being understood that when boss 15 enters cavtiy 14 near the end of the stroke of the piston assembly in response to pressure applied to the opposite side of piston assembly 5, the boss substantially seals the cavity 14 relative to the cylinder bore so that fluid compressed between the piston and the internal face of the cylinder head 5 is formed through passage 12, bore 8 and passage 13 to cavity 14 and its associated supply-exhaust port at a rate dependent upon the adjustment of the needle valve assembly 7, thus providing desired cushioning at the end of the piston stroke.

The previously mentioned bore 8 and associated stepped counterbores 9, 10 and 11 are especially adapted to receive and secure the hereinafter described needle valve assembly 7. Specifically, a bevel, at the mouth of counterbore 9 comprises an annular oblique intersection 16 between the bottom of counterbore 10 and the wall of counterbore 9, and an annular undercut 17 disposed at the intersection between the bottom and wall of counterbore 11 and extending in a direction axially of the counterbore 11, forms an axially protruding annular shoulder 18 disposed at the intersection between the bottom of bore 11 and the wall of bore 10, for purposes hereinafter described.

The needle valve assembly 7 comprises a screw member generally indicated at 19 and threadedly received in a nut member generally indicated at 20.

The screw member 19 comprises a threaded shaft 21, one end of which is smooth and tapered at 22 for partial insertion and withdrawal thereof relative to passage 13 to vary the rate of flow of fluid from passage 13 through bore 8 and into passage 13, and the other end of which includes a transverse slot 23 for engagement by a tool, not shown, for axially adjusting the shaft relative to the nut upon rotation of the shaft.

The nut member 20 includes a threaded bore 24 axially extending therethrough and receiving the threaded shaft 21 of screw member 19, and further comprises a pair of axially displaced nut portions 25 and 26 of different external diameters, the smaller nut portion 26 being received in and engaging the bottom of counterbore 9, and the larger nut portion 25 being simultaneously received in and engaged with the bottom of counterbore 10, as shown in FIG. 2 of the drawing. An annular necked portion 27 comprising a groove is disposed at the intersection between the nut portions 25 and 26 and immediately adjacent the hereinbefore described oblique intersection 16 between counterbores 9 and 10 so that the annular oblique intersection 16 and the walls of groove 27 cooperate to define an annular cavity surrounding the nut 20.

A suitable metal to metal cement 28 is disposed in the cavity formed by intersection 16 and groove 27 to prevent escape of fluid under pressure from bore 8 around the perimeter of the nut to atmosphere.

Figure 3:
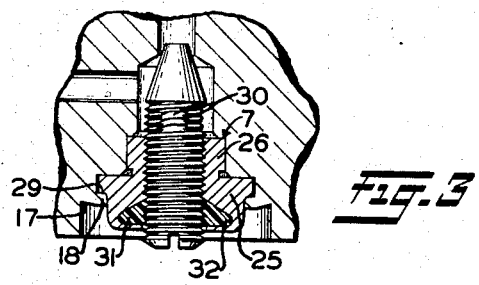
FIG. 3 is a sectional view similar to that of FIG. 2 and showing the needle valve device completely installed in the cylinder head.

To prevent removal of the nut 20 after installation in the cylinder head, the aforementioned shoulder 18 is peened over a perimetric shoulder 29 on nut portion 25, as shown in FIG. 3, after the needle valve assembly 7 is installed in the cylinder head.

To prevent withdrawal of the screw member 19 from the nut member 20 after installation of the needle valve assembly 7 in the cylinder head, the first several threads of the screw member adjacent the tapered end 22 are distorted, as at 30, in any suitable manner, as by hammering, before the needle valve assembly is installed in the cylinder head.

To facilitate frictional holding of the screw member 19 in any adjusted position relative to the nut 20, and to prevent fluid under pressure from escaping from bore 8 between the threaded shaft 21 and the threaded bore 24 of the nut 20 to atmosphere, suitable packing, such as a fibre insert 31, is disposed in an annular cavity 32 surrounding and opening to the threaded bore 24, the packing tightly engaging the threaded portion 21 of the screw 19 extending therethrough.

In assembling the needle valve assembly and installing it in the cylinder head so as to prevent later expulsion or removal of the needle valve assembly, or portions thereof, in response to vibration of the operating cylinder and fluid pressure in bore 8 or in response to adjustments thereof by an attendant, the first several threads on the screw 19 adjacent the tapered valve end are distorted or destroyed, as by hammering, for example. The screw is then inserted in the threaded bore 24 of nut 20, slot 23 first. The thread distorting operation is effected preferably prior to insertion of the screw in the nut, thus assuring the correct assembly of the screw and nut with the smaller diameter nut portion 26 disposed nearest the tapered valve end 22. If desired, the distortion of the screw threads could be effected after installation of the screw in the nut. Preferably, thereafter, cement is applied to either or both the groove 27 in nut 20 and the oblique intersection 16 in the cylinder head. The thus assembled screw 19 and nut 20 are inserted in bore 8 and counterbores 9, 10 and 11, in the position as shown in FIG. 2. The previously prepared shoulder 18 is then peened over the edge of nut portion 25, as shown in FIG. 3, thus completing installation of the needle valve assembly 7 in the cylinder head.

From the foregoing it is seen that a relatively simple needle valve assembly may be installed in a cylinder head in a relatively simple manner, which effectively prevents accidental removal or explusion of the needle valve assembly or its parts from its installed position when the cylinder device is in operation.

Having now described the invention, what I claim as new and desire to secure by Letters Patent is:

1. A combined valve assembly and means for supporting said valve assembly in a fluid pressure system, comprising:
   (a) a body member having fluid pressure passage means therein and a bore intersecting said fluid pressure passage means;
   (b) said bore having a first counterbore axially contiguous with a larger counterbore;
   (c) said first counterbore having a beveled enlargement at the intersection thereof with said second counterbore;
   (d) a valve assembly comprising:
      (i) a nut member having a first axial portion disdisposed in said second counterbore against the bottom thereof and in close tolerance relation to the wall thereof, and a second axial portion disposed in said second counterbore against the bottom thereof and in close tolerance relation to the wall thereof;
      (ii) annular cavity means formed between the periphery of said first axial portion of said nut and said beveled enlargement of said first counterbore;
      (iii) cement means in said annular cavity means;
      (iv) an axial through bore in said nut; and
      (v) a valve member in said bore in said body and having a shaft axially adjustable in said through bore in said nut; and
   (e) means on said body member preventing axial movement of said nut.

2. A combined valve assembly and means for supporting said valve assembly in a fluid pressure system, as recited in claim 1, in which said periphery of said first axial portion of said nut includes an annular groove opposite said beveled enlargement.

3. A combined valve assembly and means for supporting said valve assembly in a fluid pressure system, as recited in claim 1, in which:
   (a) said through bore includes a radial enlargement comprising an annular cavity in said nut; and 4. A combined valve assembly and means for supporting said valve assembly in a fluid pressure system, as recited in claim 1, in which:
   (a) said bore in said body includes a third counterbore contiguous with said second counterbore;
   (b) said second axial portion of said nut includes a peripheral flange; and
   (c) shoulder means in said third counterbore disposed in overlying engagement with said flange.

(References on following page)

References Cited

UNITED STATES PATENTS

| | | | |
|---|---|---|---|
| Re. 19,309 | 9/1934 | Archer et al. | 29—510 |
| 103,775 | 5/1870 | Prosser | 151—57 |
| 2,487,129 | 11/1949 | Hallock | 29—511 X |
| 3,112,759 | 12/1963 | De Lucia | 251—335 X |
| 3,247,767 | 4/1966 | Aslan | 251—214 X |
| 3,295,191 | 1/1967 | Gallagher et al. | 251—335 X |

FOREIGN PATENTS 240,912  10/1960  Australia.

WILLIAM F. O'DEA *Primary Examiner.*

D. R. MATTHEWS, *Assistant Examiner.*

U.S. Cl. X.R.

85—1; 137—382; 151—27; 251—214; 277—166

PO-1050
(5/69)

UNITED STATES PATENT OFFICE
CERTIFICATE OF CORRECTION

Patent No. 3,443,579            Dated May 13, 1969

Inventor(s) Charles Doolittle

It is certified that error appears in the above-identified patent and that said Letters Patent are hereby corrected as shown below:

Column 4, line 39, "dis-" should be deleted; line 40, "second" should be --first--; after line 65 insert --(b) packing means in said cavity engaging said shaft.--

SIGNED AND
SEALED

OCT 21 1969

(SEAL)
Attest:

Edward M. Fletcher, Jr.
Attesting Officer

WILLIAM E. SCHUYLER, JR.
Commissioner of Patents